US009753976B1

(12) United States Patent
Adogla et al.

(10) Patent No.: US 9,753,976 B1
(45) Date of Patent: Sep. 5, 2017

(54) PROVIDING USER-INFLUENCED SEARCH RESULTS BASED ON USER-DEFINED QUERY LANGUAGE TRANSLATION

(71) Applicant: Amazon Technologies, Inc., Reno, NV (US)

(72) Inventors: Eden Grail Adogla, Seattle, WA (US); Vikram Bisht, Gainesville, FL (US)

(73) Assignee: Amazon Technologies, Inc., Reno, NV (US)

( * ) Notice: Subject to any disclaimer, the term of this patent is extended or adjusted under 35 U.S.C. 154(b) by 147 days.

(21) Appl. No.: 14/032,048

(22) Filed: Sep. 19, 2013

(51) Int. Cl.
*G06F 17/30* (2006.01)

(52) U.S. Cl.
CPC .............................. *G06F 17/30448* (2013.01)

(58) Field of Classification Search
CPC ......... G06F 17/30867; G06F 17/30864; G06F 17/3064; G06F 17/30648; G06F 17/30657
USPC ........... 707/22, 706, E17.014, 723, E17.044, 707/E17.108, 710, 732, 749, E17.089, 707/703, 737, 740, 741, 769, E17.002, 707/E17.005, E17.028, E17.045, E17.059, 707/E17.083, E17.084, E17.107, 610, 707/634, 639, 705, 708, 709, 727, 728, 707/731, 734, 736, 748, 758, 803; 709/206, 201, 203, 204, 209, 219, 224, 709/231; 705/14.69, 7.32, 7.36, 14.25, 705/14.39, 14.44, 14.53, 14.66, 16, 2, 21, 705/26.7, 3, 64, 7.31, 7.39, 7.42
See application file for complete search history.

(56) References Cited

U.S. PATENT DOCUMENTS

| | | | |
|---|---|---|---|
| 6,460,029 B1 | 10/2002 | Fries et al. | |
| 6,647,383 B1 * | 11/2003 | August | G06F 17/30867 |
| 6,728,706 B2 | 4/2004 | Aggarwal et al. | |
| 8,121,997 B2 * | 2/2012 | Raciborski | 707/706 |
| 8,316,037 B1 * | 11/2012 | Garg et al. | 707/758 |
| 8,600,973 B1 | 12/2013 | Popovici et al. | |
| 2007/0239676 A1 | 10/2007 | Stonehocker et al. | |
| 2008/0021887 A1 * | 1/2008 | Brinson et al. | 707/3 |
| 2008/0301112 A1 * | 12/2008 | Wu | G06Q 30/02 |
| 2012/0066208 A1 * | 3/2012 | Yankovich et al. | 707/723 |
| 2012/0110087 A1 * | 5/2012 | Culver | G06F 17/5004 709/205 |
| 2012/0150850 A1 * | 6/2012 | Parthasarathy et al. | 707/728 |
| 2012/0203584 A1 * | 8/2012 | Mishor | G06Q 30/02 705/7.11 |
| 2012/0215655 A1 * | 8/2012 | Shedletsky, III | 705/26.7 |
| 2012/0278318 A1 | 11/2012 | Reznik | |

(Continued)

OTHER PUBLICATIONS

U.S. Appl. No. 14/032,042, filed Sep. 19, 2013, Titled: Providing User-Influenced Search Results Based on Product Attributes.

*Primary Examiner* — Jay Morrison
*Assistant Examiner* — Ken Hoang
(74) *Attorney, Agent, or Firm* — Kilpatrick Townsend & Stockton LLP

(57) ABSTRACT

Techniques for providing user-influenced search results may be provided. The system can introduce an enhanced query language that allows users to reprogram a computer system responsible for providing search results. In an embodiment, the enhanced query language is generated by the system and exposed to users. In another embodiment, a query language is generated by the user and translated by the system to an enhanced query language.

25 Claims, 11 Drawing Sheets

(56) References Cited

U.S. PATENT DOCUMENTS

2013/0132364 A1* 5/2013 Udupa et al. ............... 707/709
2014/0046934 A1* 2/2014 Zhou ............... G06F 17/30991
                                                   707/723

* cited by examiner

PROVIDING USER-INFLUENCED SEARCH RESULTS BASED ON USER-DEFINED QUERY LANGUAGE TRANSLATION

CROSS REFERENCE TO RELATED APPLICATIONS

This application is related to and incorporates by reference for all purposes the full disclosure of co-pending the U.S. patent application Ser. No. 14/032,042 filed herewith, entitled "PROVIDING USER-INFLUENCED SEARCH RESULTS BASED ON PRODUCT ATTRIBUTES".

BACKGROUND

Various web pages incorporate search engines to help users find information associated with the web page. These search engines typically receive a search query from a user that contains text-based terms. The search engine performs a text-based search of contents on the web page and provides a breadth of information in the form of search results related to the search query. However, the search results may not be sufficiently relevant to the users.

In one example, the user provides a search query for the item "cookies without nuts" because the user would like to receive a list of cookies that do not contain ingredients with nuts. The user may have an allergic reaction to nuts. In a typical search, the system may use to search query to retrieve three sets of results, including one set of search results for the term "cookies," one set of search results for the term "without," and one set of search results for the term "nuts." Some search engines will discard the search results associated with the term "without" which leaves two sets of search results for "cookies" and "nuts." The system will provide a combined set of search results to the user, which contains products for cookies and products with nuts. The user may find several items from the list that contain nuts, become frustrated, and stop visiting the web page. In some instances, the user may not realize the products have nuts, order the product, and subsequently have a violent allergic reaction to the product when the user proceeds to consume the product.

Another unsatisfactory outcome of standard search queries is the use of certain ambiguous search terms. Users provide search queries to the search engines using terms that the user feels will give the most appropriate results for what the user is searching for. However, certain terms that users provide in the search query may have different meanings depending on who is doing the search and what the user's expectations are for search results.

BRIEF DESCRIPTION OF THE DRAWINGS

Various embodiments in accordance with the present disclosure will be described with reference to the drawings, in which.

DETAILED DESCRIPTION

Figure 1:
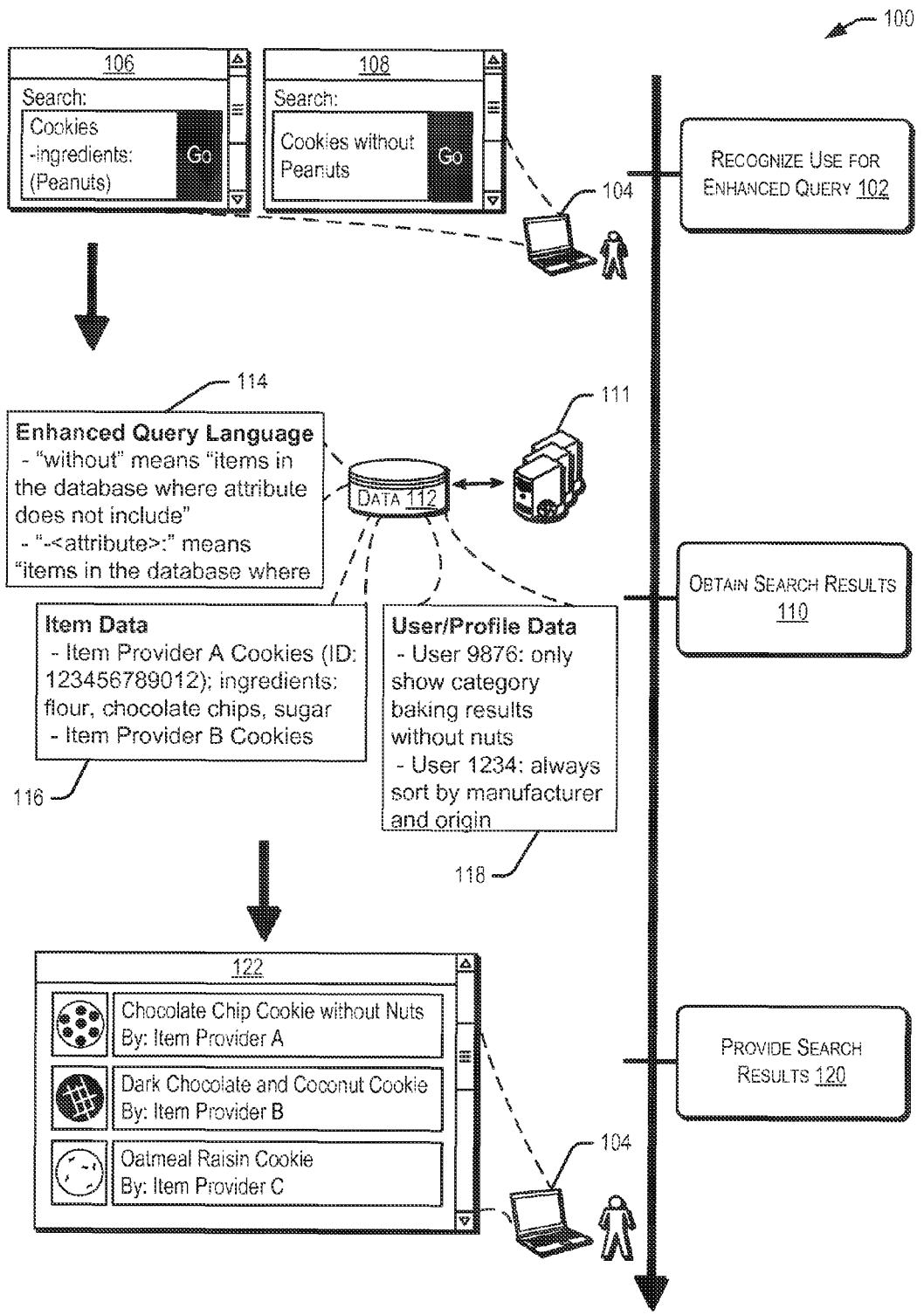
FIG. 1 is a pictorial diagram illustrating two example network pages that receive search queries from a user and a system that provides user-influenced search results based on item attributes.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Embodiments of the present disclosure are directed to, among other things, a system for providing user-influenced search results through the use of an enhanced query language. The system can introduce an enhanced query language that allows users to reprogram a computer system responsible for providing search results (e.g., a search engine). In an embodiment, the enhanced query language is generated by the system and exposed to users. In another embodiment, a query is provided by the user and translated by the system to an enhanced query language.

When the enhanced query language is generated by the system and exposed to users, the users can use the enhanced query language to generate at least a portion of a search query related to an item, for example, by adding a dash to the search query. The system can recognize that the user's search query would benefit from incorporating an enhanced query language (e.g., if the dash means filter a term from the search results) and proceeds to parse the search query as an enhanced search query. In another embodiment, the system can provide information that assists the user in generating the enhanced search query using the enhanced query language (e.g., providing information to the user that a dash means to filter the term from the search results). In an embodiment, the user may provide feedback in response to the information. The enhanced search query can be used to obtain search results from a data store that is provided to the user.

When a query is provided by the user and translated by the system to an enhanced query language, the user can provide one or more search queries related to an item. The user can provide feedback to the system to help instruct the system on how to interpret the terms (e.g., cookies, nuts) or syntax (e.g., a dash) used in the user's search query. The system can use feedback from the user to translate the user's search query into an enhanced search query or use the feedback from the user to generate an enhanced query language. The user-defined syntax contained in the search query can map to syntax in the enhanced query language, so that the system can translate the user's syntax to system-defined syntax. In these and other embodiments, the enhanced query language can be used to obtain enhanced search results that include items related to a search term that have been aggregated, filtered, or ordered based on user data.

In an embodiment, the system can capture user preferences and store the user preferences as user data or profile data. For example, the user can provide a search query and interact with the system to also provide user preferences. The interaction can be by purchasing items, scrolling through search results, leaving a network page without purchasing an item, providing feedback, or other actions. The system may store the user preferences in a data store as a collection of rules associated with input provided by that user. The search results may also be generated as enhanced search results, so that the output is pleasing to the user, for example, by aggregating, filtering, or ordering the search results in a manner defined by the user or the system.

The search query can incorporate additional information associated with an item, including item attributes that may not be displayed on an item's network page. Item attributes may help describe an item. The description can be gathered from several sources, including metadata, data stores, and may vary by item. For example, item attributes associated with a box of cookies may include ingredients, manufacturer, origin country, weight of the box, description of the cookies, price, and flavors. In another example, item attributes for a movie on a digital video disc (DVD) may the name of the actors that star in the movie, shooting locations, producer, and year that the movie was released. In yet another example, item attributes for a laptop may include the processor speed, the amount of memory the laptop contains, the color of the casing, dimensions of the laptop, and the manufacturer. Other items may include item attributes that define whether the item was produced in a fair trade country or whether or not the products affect endangered species.

A search query may include query syntax. Query syntax can include a query operator that corresponds to a particular operation. In a non-limiting example, query syntax can include a minus symbol and a search term, for example "-peanuts," which can signify that a user does not want items associated with a particular term (peanuts) to appear in search results. In another example, query syntax can include a colon and parentheses with a search term, for example ":(peanuts)," which may signify that the user wants the items within the parentheses (peanuts) included in search results. In an embodiment, the search terms (e.g., cookies, DVD) may correspond with item data associated with an item.

In an embodiment, the use of particular query syntax may be recognized by the system as the user instructing the system to accept or generate an enhanced query defined by an enhanced query language. In an embodiment, the system can identify the use of pre-defined query syntax in the search query. In another embodiment, the system can recognize that a search query provided by the user would benefit from incorporating an enhanced query language and identify query syntax provided by the user. For example, when the system identifies the query syntax provided by the user, users can teach a search engine to understand what the terms mean in a search query rather than the search engine merely interpreting the search query and providing search results. The search query can be submitted to a data store to obtain search results and search results can be provided to the user.

FIG. 1 is a pictorial diagram illustrating two example network pages that receive search queries from a user and a system that provides user-influenced search results based on item attributes. In illustrative flow 100, a user may access a user device that includes an application, for example, a web browser or an application on a mobile device, in order to provide a search query. In an embodiment, a user may operate a user device 104 to access a network page 106 and provide a search query in a network page. The network page 106 can receive a search query through a text box on the network page. The search query may use query operators. In an embodiment, the syntax may be defined by the system, so that when the user provides the search query to an application 106, the user provides syntax recognized by the system. The system may then recognize the use for an enhanced search query through the use of query syntax or query operators. For example, a minus symbol, a dash with parentheses, or a colon can be query operators that notify the system to aggregate, filter, or order the search results in a particular way.

The system may recognize the use for an enhanced query 102 in various ways. In an embodiment, the use of query operators can notify the system that an enhanced search query could be provided by the user. The system may recognize that the search query provided by the user would benefit from incorporating the enhanced query language. In another embodiment, the system may receive a search query without syntax defined by the system and instead defined by the user. The system may interact with the user to refine the meaning of the search query provided in the application 108. In an embodiment, the network page 108 can receive a search query that includes query syntax but not query operators.

In yet another embodiment, the system may recognize the use of an enhanced query language associated with one or more interactions. The one or more interactions may be requests to receive search results, selecting items on a network page, scrolling through items, providing information about items, receiving requests to purchase items, or other interactions associated with the system providing information to a user. The interactions may be associated with a threshold. In an embodiment, the threshold may identify that a comment should be provided to initiate feedback from the user. The provided comment may be visual (e.g., causing a prompt, comment box, text, or images to be displayed) or non-visual (e.g., spoken word, indicating information for users with disabilities). The threshold can be a limit associated with the number of interactions received from the user, including providing more than two sets of search results, failing to receive a request to purchase an item after providing one set of search results, providing or scrolling through multiple items without requesting to purchase any of the items, or other indications of user frustration.

In an illustrative example, the system can receive an indication that one or more interactions have exceeded a threshold. For example, the user can operate the application 108 to search for pants and submit a first search query including "Black Pants," a second search query including "Acme A Brand Pants," and a third search query including "Black Acme A Brand trousers," but not purchase any items returned in the search results. The system may receive an indication that one or more interactions (e.g., the search queries) have exceeded a threshold (e.g., three), or that the user conducted at least three searches without purchasing, clicking on, or otherwise selecting an item and each of the search queries was related to the item. The system may cause a comment to be provided to initiate the feedback from the user after receiving the indication. In another example, the user can operate the application 108 to search for pants and submit one search query including "Acme A Brand Pants Black 500 Size B." The user may purchase the first search result out of a plurality of search results. The system may receive an indication that one or more interactions have not exceeded a threshold (e.g., when the threshold is set to three interactions), or may not receive an indication at all. In an embodiment, the threshold may not have been exceeded because the system provided the user with one set of search results and the user purchased the item quickly. In this example, the system may not cause a comment to be provided because no indication was received.

The system may recognize that the search query from the user would benefit from incorporating an enhanced query using an enhanced query language. For example, if an indication confirmed that one or more interactions have exceeded a threshold, the search queries may benefit from incorporating the enhanced query language. In another example, certain terms can notify the system that the use of an enhanced query language may be beneficial, including "without," "less than," "at least," or "no." Other terms may be incorporated with the system without diverting from the scope of the disclosure.

The system can obtain search results 110. For example, the user may press "go" or otherwise transmit the search query from the application 106, 108 to a server 111. In an embodiment, the server computer 111 can access a data store 112. The data store 112 can access the enhanced query language 114, item data 116, user or profile data 118, and other data when processing the search query and obtaining the search results.

Search results may be obtained from a data store for one or more terms in a search query. For example, if three terms are included in the search query, three sets of search results may be obtained. In an embodiment, the three sets of search results can be aggregated, by combining the three sets of search results into one set of search results and providing the aggregated set of search results to the user. In another embodiment, the three sets of search results can be filtered, by removing any items from one set of search results from another set of search results. In yet another embodiment, the three sets of search results can be ordered. For example, the first set of search results may be placed above the other two sets of search results, or particular items in each set can be placed above other particular items in each set of search results. In another example, search results can be ordered by other factors, including placing the best-selling items from each of set of search results at the front of the search results. In some embodiments, the search results may be refined. For example, the search results may be refined based at least in part upon feedback from the user to generate the enhanced search query. In another example, the search results may be refined based at least in part on aggregating, filtering, or ordering the search results based upon a query operator.

In an embodiment, the search query received from the user may be parsed to create search terms and query syntax. The received query syntax may be compared with enhanced query syntax defined by the system for the enhanced query language. The comparison can generate a rule and/or user data related to the syntax that can direct the system how to treat the received search query. After the comparison, the system may determine that there is a distinction between the received query syntax and the enhanced query syntax. The system may provide information to the user that assists the user in generating a correct search query using the appropriate query syntax. The system can receive an enhanced search query from the user in response to the information.

The search query that the system provides to the data store to obtain results may be an enhanced search query that uses query syntax defined by the enhanced query language 114. The enhanced query language can be maintained in the data store 112. For example, the enhanced query language can include one or more rules, which can instruct the system how to handle portions of the search query. The term "without" can mean "items in the data store where attribute does not include," so that when the search query is "shirts without buttons," the search query translates to "an item 'shirt' in the data store where the attribute does not include 'buttons.'" In an embodiment, the enhanced query syntax may restrict the results received from the data store.

Each item may be associated with item data 116. The item data can include any information associated with the item, including internal color, external color, trimming, or other identifiers that reference color. Item data can include a specific set of attributes that can be explicit and detailed. In an embodiment, the search query can be compared with item data to return a relevant item. For example, an item "Item Provider A Cookies" with item identifier 123456789012 can include the ingredients in the cookies (e.g., flour, chocolate chips, sugar) so that the user can search through those ingredients. In another example, the item can have "Brand A Black Pants Model Number 500" and can include the manufacturer of the pants, the country origin of the fabric used in constructing the pants, and the color of the pants. In another example, the item data can be associated with the volume of an item, so that the search query include a measurement of volume, the system can recognize that "volume" could be a search term as a selector key word.

In an embodiment, the data store 112 can include indices of common search terms and where they occur. For example, the search query can include "pants not pink." At first pass, the system can provide two sets of data that includes all items that contain the term "pants" and all items that contain the term "pink." The system may aggregate, filter, or order the search results. For example, anything that has both "pants" and "pink" can appear at the top of the list, or any item that appears on a best-seller list associated with either "pants" or "pink" can appear closer to the top. In an embodiment, the system may reorder or aggregate the items and provide those items as search results to the user. The indices can correlate the item location in a data store with other similar items to make searching for the list of items quicker or more efficient.

In another embodiment, the indices can translate to a particular action performed by the system. For example, the user may search for a particular attribute of an item that may not be searchable on a network page associated with the item. In a standard system, the item may include a picture that shows that the pants are pink, but a text-based search may not be able to search for "external color is pink." Through the use of the enhanced query language or the metadata associated with the items in one or more embodiments of the disclosure, the user may provide a search query that can include "external color not pink," "color not pink," or "-color: pink." The query syntax (e.g., -color: pink) can translate to a specific instruction for the system, including a filtering action, so instead of the actions being implicit, the enhanced query language makes the aggregation, filtering, or ordering instructions explicit. For example, the system may find item data associated with the product color, select the index associated with the items of a particular color, and then take the difference (e.g., filter) of any items in the records of the pants index that do not appear in the pink index. The search results may be a subset of all items returned by the data store 112. In another example, the search results may be ordered by showing the best-selling items first.

In addition to obtaining search results, an embodiment of the disclosure may update user or profile data 118. For example, the user/profile data 118 can correlate a particular user with particular rules, including user 9876 may only want to be provided search results associated with food (e.g., cookies) that do not include nuts. In another example, user 1234 may always want search results sorted by item manufacturer and country origin. Additional details related to user and profile data are described in relation to FIGS. 4 and 5.

The system can provide the search results 120. The search results illustrated in FIG. 1 may have been identified as responsive to a search query submitted by a user via the user device 104. For instance, in this example, the application 106, 108 illustrated a search query that the user submitted for "cookies -ingredients:(peanuts)" and "cookies without peanuts." Accordingly, FIG. 1 illustrates the search results in the application 122 as corresponding to various items related to cookies without peanuts. For example, the search results can include a chocolate chip cookie without nuts provided by Item Provider A, a dark chocolate and coconut cookie provided by Item Provider B, and an oatmeal raisin cookie provided by Item Provider C.

Figure 2:
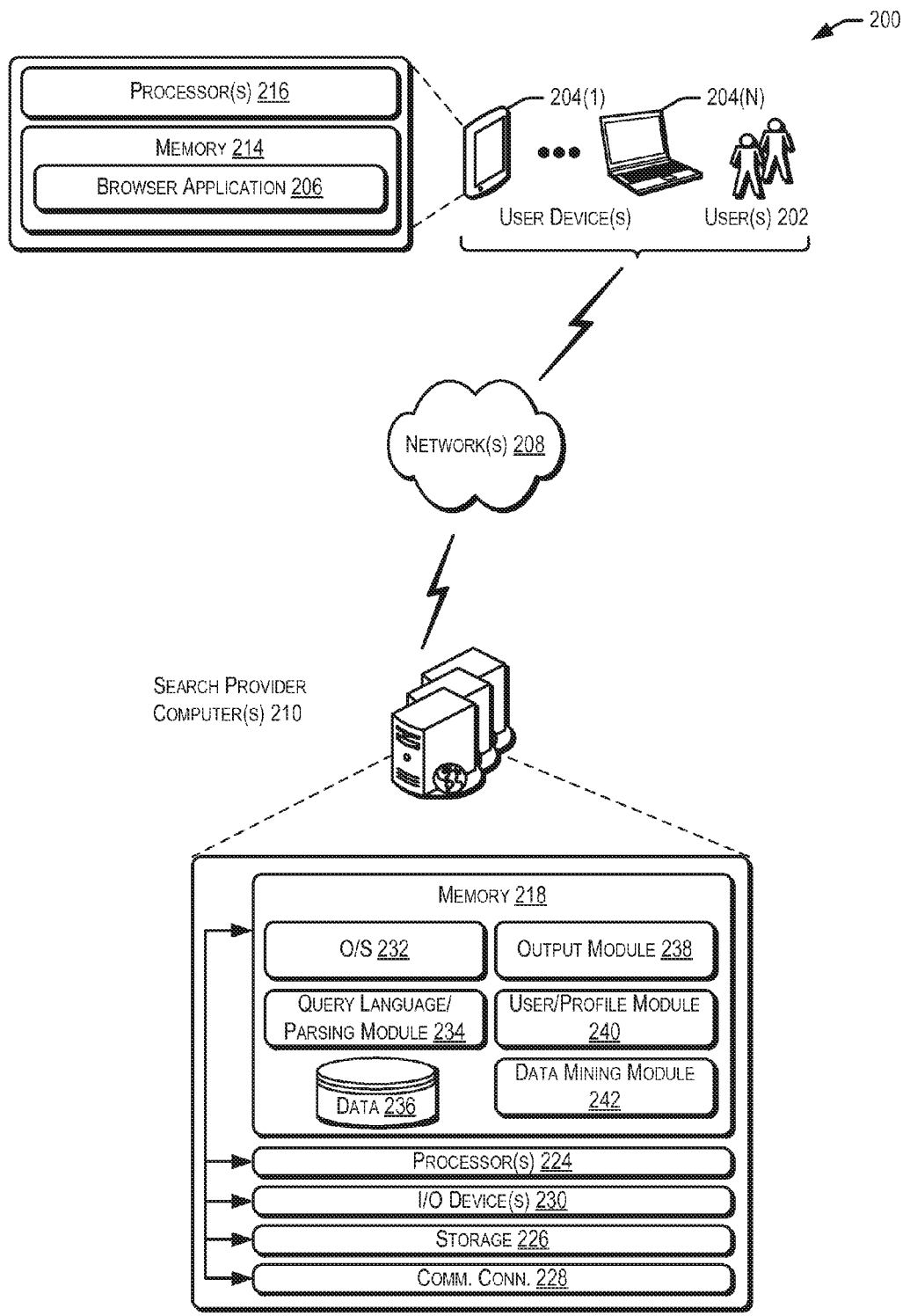
FIG. 2 is a block diagram illustrating a network environment in which user-influenced search results can be managed that includes a search provider computer and/or user device connected via one or more networks.

FIG. 2 depicts an illustrative system or architecture 200 in which techniques for providing user-influenced search results may be implemented. In architecture 200, one or more users 202 (i.e., account holders or web browser users) may utilize user computing devices 204(1)-(N) (collectively, user devices 204) to access a browser application 206, or a user account accessible through the browser application 206, via one or more networks 208. Additional aspects of the architecture may be described in relation to FIG. 11. In some aspects, the browser application 206 and/or user account may be hosted, managed, and/or provided by a computing resources service or service provider, such as by utilizing one or more search provider computers 210. The one or more search provider computers 210 may, in some examples, provide computing resources such as, but not limited to, client entities, low latency data storage, durable data storage, data access, management, virtualization, etc. In some aspects, a client entity may be deployed and/or managed virtually and/or data volumes may be stored virtually within a distributed computing system operated by the one or more search provider computers 210. The one or more search provider computers 210 may also be operable to provide web hosting, computer application development and/or implementation platforms, combinations of the foregoing, or the like to the one or more users 202.

In some examples, the networks 208 may include any one or a combination of many different types of networks, such as cable networks, the Internet, wireless networks, cellular networks and other private and/or public networks. While the illustrated example represents the users 202 accessing the browser application 206 over the networks 208, the described techniques may equally apply in instances where the users 202 interact with a search provider computer 210 via the one or more user devices 204 over a landline phone, via a kiosk, or in any other manner. It is also noted that the described techniques may apply in other client/server arrangements (e.g., set-top boxes, etc.), as well as in non-client/server arrangements (e.g., locally stored applications, etc.).

As described briefly above, the browser application 206 may allow the users 202 to interact with a search provider computer 210, such as to access web content (e.g., web pages, network pages, music, video, etc.). The one or more search provider computers 210, perhaps arranged in a cluster of servers or as a server farm, may host the browser application 206. Other server architectures may also be used to host the browser application 206. The browser application 206 may be capable of handling requests from many users 202 and serving, in response, various user interfaces that can be rendered at the user devices 204 such as a graphical user interface (GUI). The browser application 206 can provide any type of website that supports user interaction, including social networking sites, online retailers, informational sites, blog sites, search engine sites, news and entertainment sites and so forth. As discussed above, the described techniques can similarly be implemented outside of the browser application 206, such as with other applications running on the user devices 204.

As noted above, the architecture 200 may include one or more user devices 204. The user devices 204 may be any type of computing device such as, but not limited to, a mobile phone, a smart phone, a personal digital assistant (PDA), a laptop computer, a desktop computer, a thin-client device, a tablet PC, etc. In some examples, the user devices 204 may be in communication with the search provider computers 210 via the networks 208, or via other network connections. While the following description may regularly refer to interaction between the user devices 204 and the search provider computers 210, it is to be understood that any communication to or from the user devices 204 may be via the search provider computers 210.

In one illustrative configuration, the user devices 204 may include at least one memory 214 and one or more processing units (or processor(s)) 216. The processor(s) 216 may be implemented as appropriate in hardware, computer-executable instructions, firmware, or combinations thereof. Computer-executable instruction or firmware implementations of the processor(s) 216 may include computer-executable or machine-executable instructions written in any suitable programming language to perform the various functions described. The user devices 204 may also include geo-location devices (e.g., a global positioning system (GPS) device or the like) for providing and/or recording geographic location information associated with the user devices 204.

The memory 214 may store program instructions that are loadable and executable on the processor(s) 216, as well as data generated during the execution of these programs. Depending on the configuration and type of user device 204, the memory 214 may be volatile (such as random access memory (RAM)) and/or non-volatile (such as read-only memory (ROM), flash memory, etc.). The user device 204 may also include additional removable storage and/or non-removable storage including, but not limited to, magnetic storage, optical disks, and/or tape storage. The disk drives and their associated computer-readable media may provide non-volatile storage of computer-readable instructions, data structures, program modules and other data for the computing devices. In some implementations, the memory 214 may include multiple different types of memory, such as static random access memory (SRAM), dynamic random access memory (DRAM), or ROM.

Turning to the contents of the memory 214 in more detail, the memory 214 may include an operating system and one or more application programs or services for implementing the features disclosed herein, such as web browsers or dedicated applications (e.g., smart phone applications, tablet applications, etc.) and/or the browser application 206. Additionally, the memory 214 may store access credentials and/or other user information such as, but not limited to, user IDs, passwords and/or other user information. In some examples, the user information may include information for authenticating an account access request such as, but not limited to, a device ID, a cookie, an IP address, a location, or the like. In addition, the user information may include a user 202 provided response to a security question or a geographic location obtained by the user device 204.

In some aspects, the search provider computers 210 may also be any type of computing devices such as, but not limited to, mobile, desktop, thin-client and/or cloud computing devices, such as servers. In some examples, the search provider computers 210 may be in communication with the user devices 204 and/or the browsing history management computers 212 via the networks 208, or via other network connections. The search provider computers 210 may include one or more servers, perhaps arranged in a cluster, as a server farm, or as individual servers not associated with one another. These servers may be configured to host a website (or combination of websites) viewable via the user devices 204 or a web browser accessible by a user 202.

In one illustrative configuration, the search provider computers 210 may include at least one memory 218 and one or more processing units (or processor(s)) 224. The processor(s) 224 may be implemented as appropriate in hardware, computer-executable instructions, firmware, or combinations thereof. Computer-executable instruction or firmware implementations of the processor(s) 224 may include computer-executable or machine-executable instructions written in any suitable programming language to perform the various functions described.

The memory 218 may store program instructions that are loadable and executable on the processor(s) 224, as well as data generated during the execution of these programs. Depending on the configuration and type of search provider computers 210, the memory 218 may be volatile (such as RAM) and/or non-volatile (such as ROM, flash memory, etc.). The search provider computers 210 or servers may also include additional storage, which may include removable storage and/or non-removable storage. The additional storage may include, but is not limited to, magnetic storage, optical disks and/or tape storage. The disk drives and their associated computer-readable media may provide non-volatile storage of computer-readable instructions, data structures, program modules and other data for the computing devices. In some implementations, the memory 218 may include multiple different types of memory, such as SRAM, DRAM or ROM.

The memory 218 and the additional storage, both removable and non-removable, are all examples of computer-readable storage media. Additional types of computer storage media that may be present in the search provider computers 210 may include, but are not limited to, programmable random access memory (PRAM), SRAM, DRAM, RAM, ROM, electrically erasable programmable read-only memory (EEPROM), flash memory or other memory technology, compact disc read-only memory (CD-ROM), digital versatile discs (DVD) or other optical storage, magnetic cassettes, magnetic tape, magnetic disk storage or other magnetic storage devices, or any other medium which can be used to store the desired information and which can be accessed by the search provider computers 210. Combinations of any of the above should also be included within the scope of computer-readable storage media.

The search provider computers 210 may also contain communications connection(s) that allow the search provider computers 210 to communicate with a stored database, another computing device or server, user terminals and/or other devices on the networks 208. The search provider computers 210 may also include input/output (I/O) device(s), such as a keyboard, a mouse, a pen, a voice input device, a touch input device, a display, speakers, a printer, etc.

Turning to the contents of the memory 218 in more detail, the memory 218 may include an operating system 232, one or more data stores, and/or one or more application programs or services for implementing the features disclosed herein including a query language/parsing module 234, a output module 238, a user/profile module 240, and/or a data mining module 242. The one or more data stores may include metadata, item data, or other information associated with web pages viewed by the users 202.

The query language/parsing module 234 may be configured to monitor query language provided to an application. In an embodiment, the query language/parsing module 234 may be configured to review or analyze one or more portions of the search query. For example, the query language/parsing module 234 can recognize each element, character, or term in the search query while parsing the search query or enhanced search query. The query language/parsing module may be configured to compare terms, query syntax, operators, or enhanced query syntax to determine similarities or differences between them. The query language/parsing module 234 may be configured to obtain item data from a data store associated with a term from a query. In some examples, item data can include metadata associated with items. The search results or enhanced search results can include at least one item that was found using the metadata associated with the item and provided by the output module 238.

The output module 238 may be configured to collect the information analyzed by the query language/parsing module 234 and provide search results. For example, the search results can be provided to the application on a user device so that the user can review the search results. In an embodiment, the output module 238 may provide search results that have been aggregated, filtered, or ordered by the system.

The user/profile module 240 may be configured to manage collected or saved information associated with a user. For example, the user may identify that all search results should be sorted alphabetically. The rule may be stored with user or profile data in the data 236 and provided as a rule to the system before search results are provided to the user.

The data mining module 242 may be configured to recognize patterns in the data store or previous interactions with the user. For example, all users from Paraguay may want search results sorted by country of origin, with items from Paraguay listed at the top. The data mining module 242 may be configured to recognize the pattern and store a default rule associated with any user data from Paraguay to provide search results in this manner. In an embodiment, the data mining module may analyze historical user data to determine whether one or more past interactions have exceeded a threshold, a purchase history, or user interactions during a browsing session with the browser application.

The memory 218 may store program instructions that are loadable and executable on the processor(s) 224, as well as data generated during the execution of these programs. Depending on the configuration and type of search provider computers 210, the memory 218 may be volatile (such as RAM) and/or non-volatile (such as ROM, flash memory, etc.). The search provider computers 210 or servers may also include additional storage 226, which may include removable storage and/or non-removable storage. The additional storage 226 may include, but is not limited to, magnetic storage, optical disks and/or tape storage. The disk drives and their associated computer-readable media may provide non-volatile storage of computer-readable instructions, data structures, program modules and other data for the computing devices. In some implementations, the memory 218 may include multiple different types of memory, such as SRAM, DRAM, or ROM.

The memory 218, the additional storage 226, both removable and non-removable, are all examples of computer-readable storage media. For example, computer-readable storage media may include volatile or non-volatile, removable or non-removable media implemented in any method or technology for storage of information such as computer-readable instructions, data structures, program modules, or other data. The memory 218 and the additional storage 226 are all examples of computer storage media. Additional types of computer storage media that may be present may include, but are not limited to, PRAM, SRAM, DRAM, RAM, ROM, EEPROM, flash memory or other memory technology, CD-ROM, DVD or other optical storage, magnetic cassettes, magnetic tape, magnetic disk storage or other magnetic storage devices, or any other medium which can be used to store the desired information and which can be accessed by the search provider computers 210. Combinations of any of the above should also be included within the scope of computer-readable media.

Alternatively, computer-readable communication media may include computer-readable instructions, program modules, or other data transmitted within a data signal, such as a carrier wave, or other transmission. However, as used herein, computer-readable storage media does not include computer-readable communication media.

A few additional examples of the operations of the search provider computers 210 is also described in greater detail below with reference to FIGS. 3-11.

Figure 3:
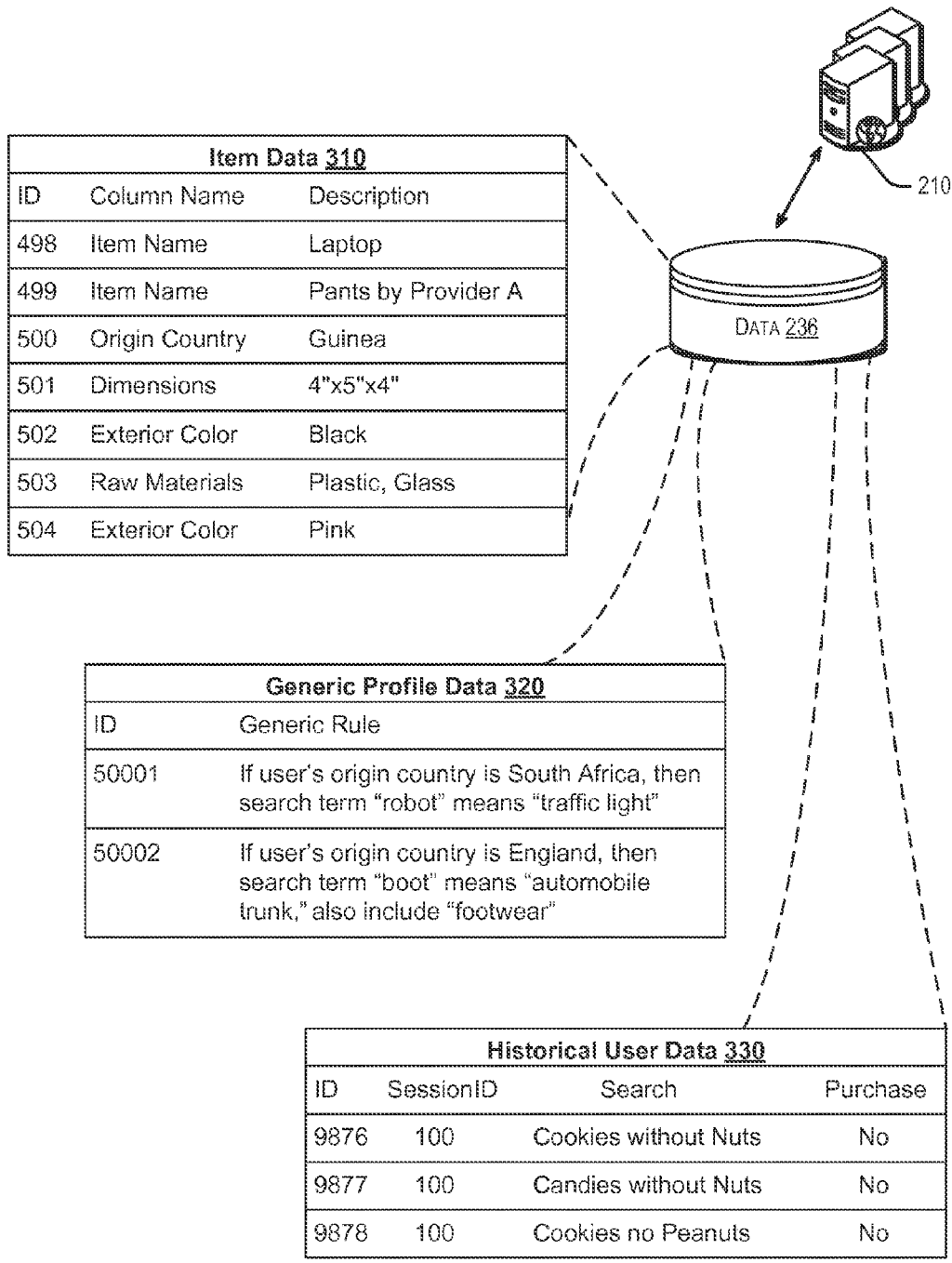
FIG. 3 is a block diagram illustrating an example architecture for a data store for managing user-influenced search results.

FIG. 3 is a block diagram illustrating an example architecture for a data store for managing user-influenced search results. In an embodiment, the data store 236 can include item data 310, generic profile data 320, and historical user data 330.

Item data 310 can include any information associated with one or more items. The items may be listed on a network page and be provided for sale by an item provider (e.g., a merchant, seller). The items can be associated with one or more item identifiers, which can identify the type of item data for the item. Item data can include item name (e.g., laptop, pants by Provider A), origin country (e.g., Guinea), dimensions (e.g., 4"×5"×4"), exterior color (e.g., black, pink), raw materials used to construct the item (e.g., plastic, glass), and other information.

The data store 236 can include generic profile data 320. The generic profile data 320 can include rules associated with default aggregation, filtering, or ordering rules for one or more users. The rules may be associated with an identifier. For example, rule identifier 50001 can be "if user's origin country is South Africa, then search term 'robot' means 'traffic light.'" In another example, rule identifier 50002 can be "if user's origin country is England, then search term 'boot' means 'automobile trunk' and may also include 'foot ware.'"

The data store 236 can include historical user data 330. Historical user data 330 can include any searches conducted with the search provider computer 210. The searches may be associated with an identifier, session identifier, the search query used, and whether an item was purchased that related to at least one term in the search query. For example, a first search could have been conducted and saved with identifier 9876 and session identifier 100, including search query "cookies without nuts," and the user may not have purchased any items provided in the search results. A second search could have been conducted with identifier 9877 in the same session history (100). The search query associated with this identifier could be "candies without nuts" and the user may not have purchased any items provided in the search results. A third search could have been conducted with identifier 9878 in the same session history (100). The search query associated with this identifier could be "cookies no peanuts" and the user may not have purchased any items provided in the search results.

A session identifier may identify a user's browsing session in an application. In an embodiment, the same session identifier may signify that the same user used the same browser application. In an embodiment, the session identifier may be analyzed to determine if more than one search query was submitted by a user, even if the user does not provide a profile or login credentials.

In an embodiment, the data in the data store 236 can include indexes. For example, the tables in the data store 236 tables when can have an index to search quickly without having to scan the tables with every search. The indexes may help identify a particular location in the data store. A process can be implemented before a search query is submitted that can scan the data in the data store and correlate similar concepts. The correlation can be indices, so that when the search query is submitted by the user, rather than scanning the data store 236, the system may merely review the indices associated with the search query and access the data location directly. In an embodiment, the search query can provide the constraints as a term in the search query. For example, an index may be related to pants, a search query can include "Brand A pink pants," and the search engine can locate the items associated with this index by retrieving the data at each location. The indices may be used instead of scanning all data in the data store 236 for the items associated with the search terms in the search query.

In an embodiment, the search query may be submitted to a web service computer (not shown). The web service computer can accept the search query, parse the search query to terms, system, and/or operators, and provide items and associated item data in response. The web service computer may be located, in an operational sense, between the search provider computer 210 and the data store 236.

In an embodiment, the historical user data 330 may also track user clicks or other user interactions. For ease of reference, only clicks are described in embodiments through the rest of this disclosure, but other interactions could be tracked. The user clicks may help generate an indication associated with one or more interactions, or whether the interactions have exceeded a threshold. For example, the interactions may be related to requests for items or previous purchases. The analysis can include specific search queries or sets of search queries in a session history from the past where the user may have been frustrated or dissatisfied with the search results. The subsequent set of search queries can be started with information or a comment to the user. In an embodiment, the system may cause the information or comment to be provided to initiate feedback from the user after receiving an indication that one or more interactions have exceeded the threshold. For example, the comment may include: "In 2010, we showed you results that looked like this and we noticed that you did not purchase an item. You immediately logged off and didn't buy anything. Were the search results not what you were looking for? There is this new feature that allows you to provide feedback to us to improve your search results. Would you like to take a look and see if we can improve upon the kind of results we show you?" This may be advantageous because the user may be able to relate to the past search queries in order to establish user data and other user preferences.

Figure 4:
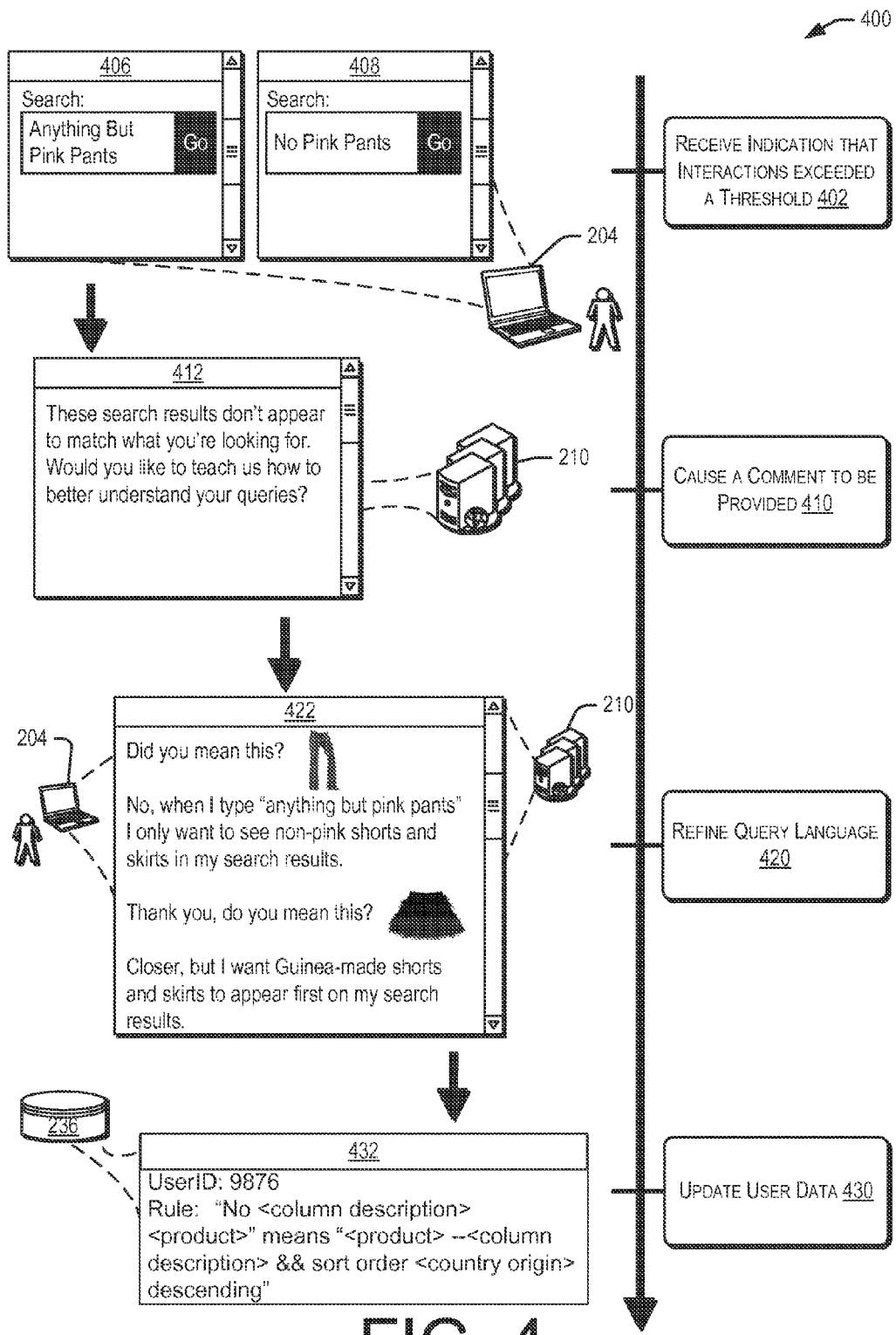
FIG. 4 is a pictorial diagram illustrating two example network pages that receive search queries and a system that helps generate an enhanced query language and update user data associated with a user.

FIG. 4 is a pictorial diagram illustrating two example network pages that receive search queries and a system that helps generate an enhanced query language and update user data associated with a user.

In illustrative flow 400, the system can receive an indication that one or more interactions have exceeded a threshold 402. As shown above, the indication that one or more interactions have exceeded a threshold can be a quantitative measurement of interactions by the user with the system. In one embodiment, the user can provide one or more search queries to an application, including a first query 406 and a second search query 408 via a user device 204. In another embodiment, the system can review historical user data and determine that the user's previous search history did not result in a purchase. In yet another embodiment, the user may search once, scroll through multiple listings of items and select but not purchase any items. For example, the system may determine that the user is not receiving what the user expected (e.g., irrelevant search results) or they are not finding what the system provided within the first few results.

The system can cause a comment to be provided 410. The comment can be an attempt to receive feedback from the user. For example, the comment 412 can say "the results don't appear to match what you are looking for, would you like to teach us how to better understand your queries?" In an embodiment, the comment can be provided next to the query. For example, a pop-up box or drop down menu may appear and say "if you don't like your results here you could click this link and see if we can better understand what you are looking for." The link may direct the user to a dictionary that defines terms in an enhanced query language. In another embodiment, the link may direct the user to a dialog box to engage in an interaction with the user to refine the query language. In an embodiment, a comment can be accessible through a link on a network page that displays a graphical user interface (GUI).

In an embodiment, information may be provided that assists the user in generating an enhanced search query using the enhanced query language. The enhanced search query can include at least one search term (e.g., pants) and at least one query syntax (e.g., "-"). For example, the system may cause a comment to be provided to the user that assists the user in constructing an enhanced search query. The comment may include a portion of a dictionary (e.g., "no pink pants" means "pants -color (!pink)"). In another example, the information can be provided in a drop down list that can show the user how certain terms are translated by the system, or provide query syntax to help the user construct a better search query. In yet another example, the information may be provided on a separate help page without diverting from the scope of the disclosure.

The enhanced search query can request different results than the one or more search queries provided by the user. For example, the different results can exclude specific subsets of the search results to include fewer items in the enhanced search results. In another example, the different results can modify specific subsets of search results to include somewhat related items in the enhanced search results.

In an embodiment, the information may be provided to the user responsive to the indication that one or more interactions have exceeded a threshold. For example, after receiving the indication and recognizing that the search queries would benefit from incorporating an enhanced query language, the provided information that assists the user in defining terms in the search queries or associating the meaning of the syntax with the search results.

The information may be provided as the user types a search query into the application. For example, if the user starts to type "without" the system can provide "<product>" to instruct the user to type in the name of a product or a type of item that the user would like to search for, so that the search query can appear to be "without <product>." The user may continue typing "nuts" to create a search query that includes "without nuts."

The user can provide feedback to the system to help instruct the system on how to interpret the terms or syntax used in the user's search query. In an embodiment, the feedback may be provided by the user as alphanumeric text, pictures, or other explicit forms of communication to the system. In another embodiment, the feedback may be implicit. For example, the user may scroll past the first item in a list of search results without purchasing the item. The system can interpret the user's actions as the user disagreeing with the ordered search results provided by the system. The system can use the feedback from the user to translate the user's search query into an enhanced search query or use the feedback from the user to generate an enhanced query language. The user-defined syntax contained in the search query can map to syntax in the enhanced query language, so that the system can translate the user's syntax to system-defined syntax.

The system may refine the query language 420. The system can refine the query language by posing a series of questions to the user, providing sample search results, or otherwise defining what the user is expecting to see when the search results are provided in response to a query. For example, as shown in application 422, the system 210 can provide an item in response to the queries "anything but pink pants" and "no pink pants." The information provided by the system can include an image of an item (e.g., a pair of black pants). The user can operate the user device 204 to respond "no, when I type 'anything but pink pants' I only want to see non-pink shorts and skirts in my search results." The system 210 can refine the translation of "no pink pants" to mean "-color (!pink) && -description (shirt, shorts)." Various embodiments of an enhanced query language are acceptable without diverting from the scope of the disclosure. The system can respond "thank you, do you mean this?" and provide information associated with a second item (e.g., an image of a black skirt). The user can respond "closer, but I want Guinea-made shorts and skirts to appear first on my search results." Again, the system can refine the query language associated with the user to include "-order (country (Guinea)) desc."

The system can provided search results or enhanced search results based on the refined query language. In an embodiment, the enhanced search results can be based on feedback received by the system (e.g., meaning of terms, user preferences, an indication that one or more interactions have exceeded a threshold, implicit actions). For example, the search results may be ordered based on the feedback from the user instructing the system to order search results by best-seller items higher than items that are not best-selling items. In another embodiment, the feedback can be based on a purchase history of the user associated with items displayed in the search results or items associated with the historical user data.

The system can update the user data 430. Once the query language has been provided and sufficiently understood by the system, the data store 236 can be updated. In one embodiment, the user data associated with the user can be updated to reflect the new rules in the enhanced query language associated with the user. For example, the user data 432 can include a user identifier (e.g., 9876) associated with the user and a new rule, including "'No <column description><product>' means '<product>-<column description>&& sort order <country origin> descending.'" In an embodiment, the user data can be associated with an enhanced query language for the user. The user data can include at least a portion of a dictionary that associates the query language with the query syntax. For example, the dictionary may include the meaning of a term (e.g., "pop" means "soda"), the meaning of syntax (e.g., "-" means "do not include"), preferences for ordering for the user (e.g., order alphabetically), and the like. In another example, the dictionary can define what terms mean to the user and/or comprise one or more rules associated with user data.

Figure 5:
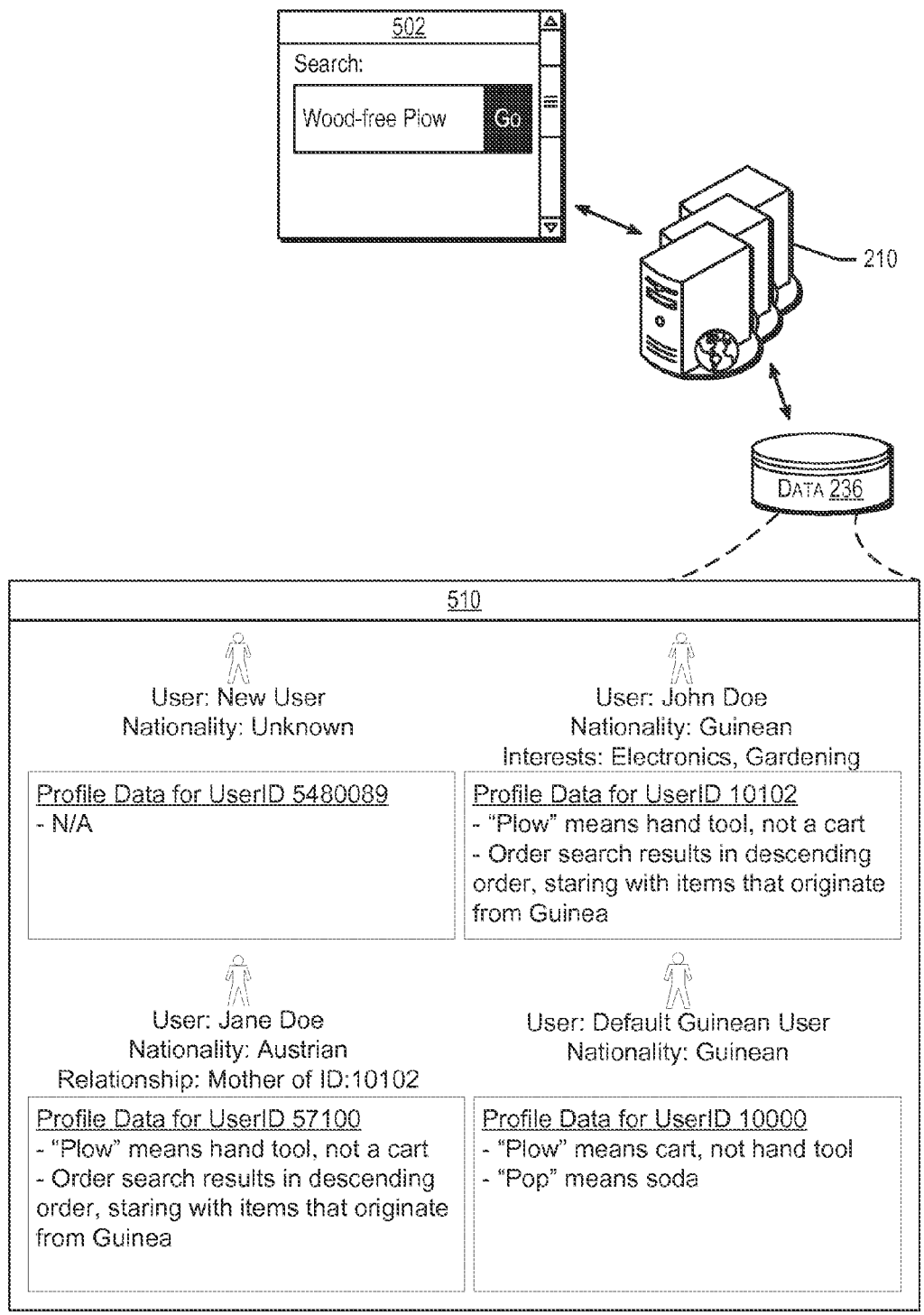
FIG. 5 is a pictorial diagram illustrating an example architecture for a data store for managing user profiles.

FIG. 5 is a pictorial diagram illustrating an example architecture for a data store for managing user profiles. In an embodiment, profiles can be implemented that associate one or more user data rules with information received from a search query or feedback provided by a user. For example, the syntax contained in the search query may not be changed based on a profile, but the translation of the terms and/or operators contained in the search query can be based on rules contained in a profile. In an embodiment, the user/profile data can contain rules that the system uses to interpret the search query. The rules may be implemented before the search results are provided to the user in response to the search query.

For example, the system 210 may receive a search query in an application 502. The search query can be for a "wood-free plow." The user can press "go" and submit the search query to the system. The system can interact with the data store 236 to obtain information on how to interpret the query, including user/profile data 510 associated with the user. If the system does not have any information on the user, the system may associate a "new user" profile with the user and conduct a search for three terms, including "wood" "free" and "plow." If an indication is received that confirms that one or more interactions have exceeded a threshold, the system may interact with the user to determine how to interpret the terms, as shown in FIG. 4. This interaction may include causing a comment to be provided to initiate feedback from the user. If the system has some information about the user, like the user's name (e.g., John Doe, Jane Doe), the system can look up the user data associated with the user to determine how to interpret the term. In this example, the user John Doe interprets the term "plow" to mean a "hand tool and not a cart." In response, the system may conduct a search for three terms, including "wood" "free" and "hand tool." The system may provide the search results to the user in a particular sort order, in descending order, starting with items that originate from Guinea, based on one or more rules associated with the user's profile.

In an embodiment, the system may create a default profile based on receiving relatively few indications that one or more interactions have exceeded a threshold associated with the profile. For example, if a particular set of rules result in higher than a threshold level of sales, the rules may be stored as a default profile and used when an alternative profile is not available.

In an embodiment, the system may combine a default enhanced query language with user data. For example, the default enhanced query language can interpret "wood-free" as "<term>-free" meaning "items that do not include <term>." The user data can interpret the term "plow" to mean "hand tool, not a cart." The search results can be affected by these interpretations. The system can conduct a search for two terms, "wood" and "hand tool," and extract the items that are shown in the search results from "wood" from the items that are shown in the search results from "hand tool" to create one set of search results. The one set of search results from the two searches can be provided to the user.

A user's profile can be shared. In an embodiment, the user may allow the system to share the user data associated with the profile with other users, so that the system can interpret the claims in a similar way across multiple users. For example, user John Doe (User ID 10102) may allow the system to share his profile with his mother, Jane Doe (User ID 57100). The system can store information on the relationship. The system may also store the rules associated with John Doe as a new set of rules associated with Jane Doe. In an embodiment, a user's profile may be inherited, so that family members or friends can automatically be associated with a profile for the group.

In an embodiment, a shared profile can be broadcast, rated, or reviewed. When the profile is broadcast, the user may provide query syntax to other users, so that the other users can use similar syntax and receive similar search results from the system. Users may rate other user's profiles, including providing a 1-10 score correlating the ease of use of the rules in the profile, the depth of the rules associated with the profile, and the like. Users may also review the profile. The reviewers can provide human-readable sentences explaining the benefits or negative aspects of the rules associated with the profile.

A master profile can be created. For example, a master profile can include rules for the system to interpret for a particular group of users, including all users that identify as Guinean. The Guinean user can be stored as a user/profile data in the data store 236. In an embodiment, when a new user interacts with the system and identifies as Guinean, the system 210 can associate a set of default rules with the user, including the term "plow" in a search query means "cart, not a hand tool," or the term "pop" in a search query means "soda."

In an embodiment, a profile can be created for users that share a similar philosophy. For example, if a user is known to be interested in organic food, the user can be associated with a default profile that interprets the terms or syntax in the user's search query with other users that provide search queries and are also interested in organic food. This can be advantageous because users of similar philosophies may use terms commonly, like an acronym or a common buzz word, and the system can interpret that commonly used term consistently for these users. In an embodiment, the philosophy can also be used to provide the search results in a particular order. For example, the items that are "organic" may be placed toward the top of the search results, even when the user did not specify a particular search order. In another example, the user that identifies as Guinean and vegan may receive search results that only include vegan items and are sorted to include Guinean items at the top, even if these rules are not specified in the search query.

In an embodiment, a profile can be created for users that share a similar geographic location. For example, if a user is known to associate with a South African nationality, the user may be assumed to associate the term "robot" with "traffic light." If the search query included the term "robot," the search results can provide items for traffic lights instead of robotic toys.

The user/profile data can be associated with the user in multiple ways. For example the user may be logged in to the system and submit a profile, so that the system can determine the user's hometown, gender, nationality, etc. In another example, a cookie can be associated with the browser application that can map to an anonymous profile on the system 210 or the data store 236. The system can prompt the user to log in and store the rules created by the user with a profile.

FIGS. 6-10 illustrate example flow diagrams showing respective processes 600, 700, 800, 900, and 1000 for providing user-influenced search results, according to at least a few examples. These processes are illustrated as logical flow diagrams, each operation of which represents a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures and the like that perform particular functions or implement particular data types. The order in which the operations are described is not intended to be construed as a limitation, and any number of the described operations can be combined in any order and/or in parallel to implement the processes.

Additionally, some, any, or all of the processes may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a computer-readable storage medium, for example, in the form of a computer program comprising a plurality of instructions executable by one or more processors. The computer-readable storage medium may be non-transitory.

Figure 6:
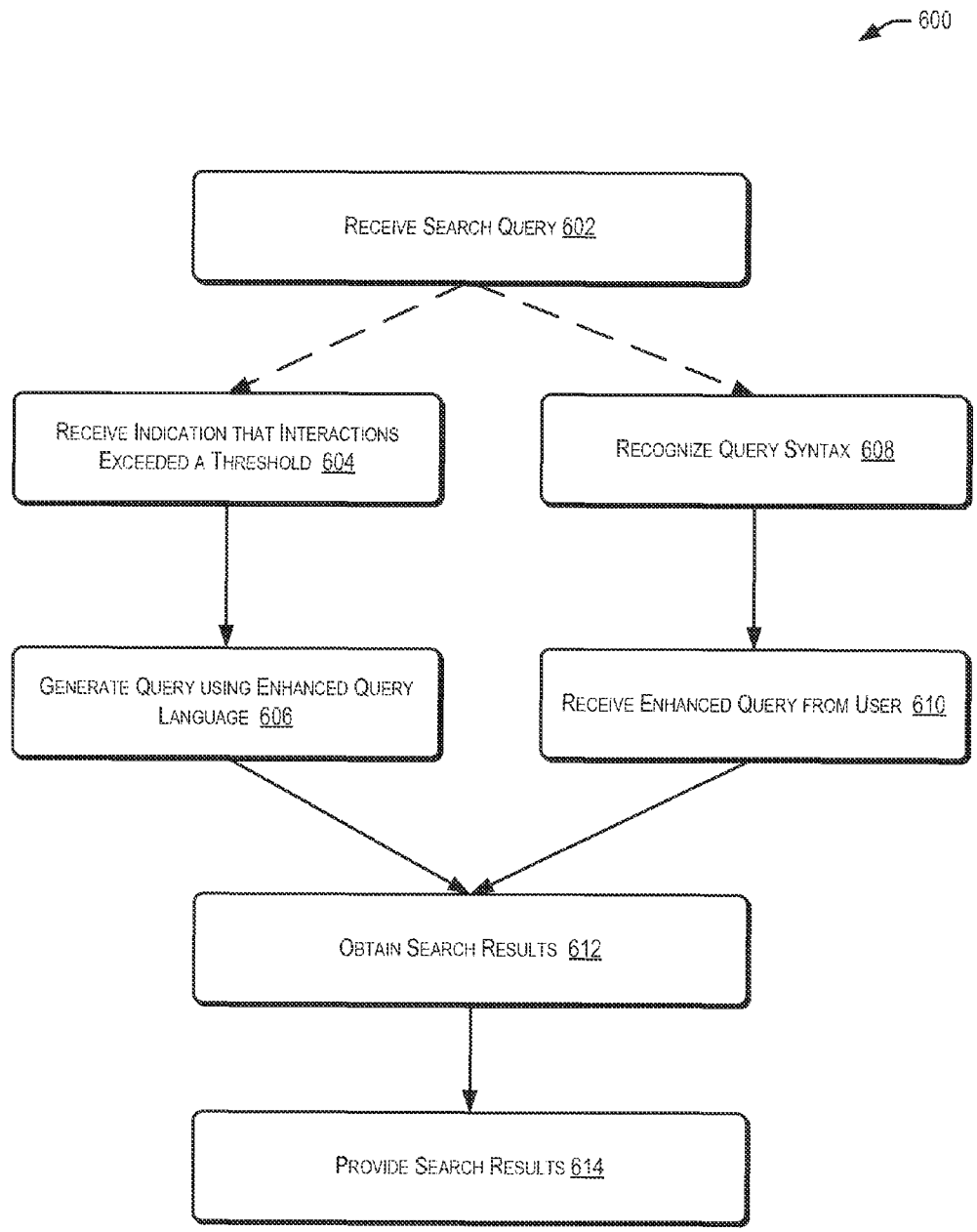
FIG. 6 is a flow diagram illustrating an example process for providing user-influenced search results.

In some examples, the one or more search provider computers 210 (e.g., utilizing at least one of the query language/parsing module 234, the output module 238, user/profile module 240, and/or the data mining module 242) shown in FIG. 2 may perform the process 600 of FIG. 6. The process 600 may begin at 602 by receiving a search query. In one embodiment, the search query may be written in a language defined by the user and proceed to step 604. In another embodiment, the search query may be written in a language defined by the system and proceed to step 608. At 604, the process 600 may include receiving an indication that one or more interactions have exceeded a threshold. At 606, the process 600 may include generating a query using an enhanced query language. At 608, the process 600 may include recognizing the query syntax. The query syntax may include system-defined syntax utilized by a user to generate the search query. At 610, the process 600 may include receiving an enhanced query from the user. At 612, the process 600 may include obtaining search results. Further in some examples, the process 600 may end at 614, where the process 600 may include providing search results.

Figure 7:
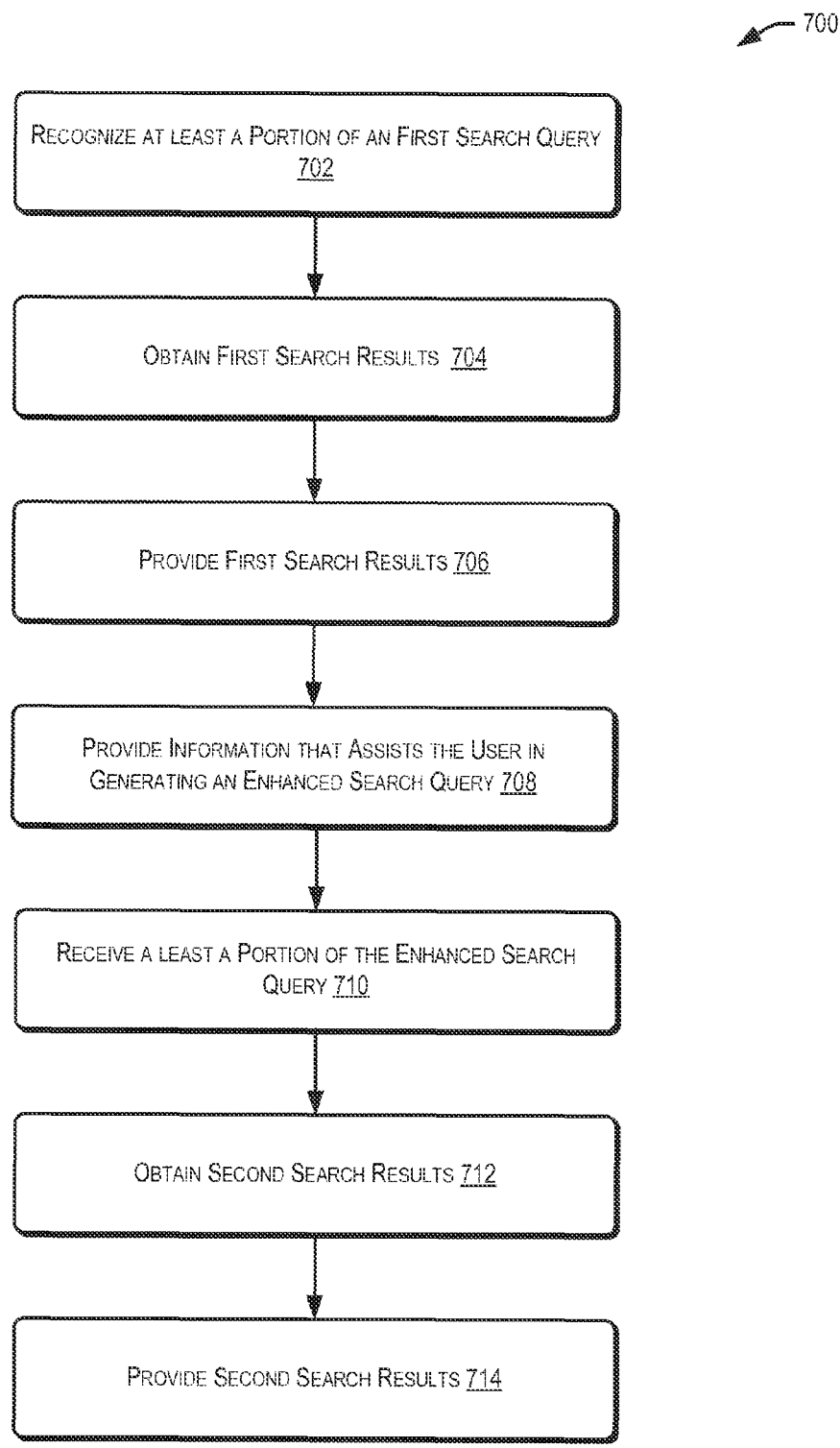
FIG. 7 is a flow diagram illustrating an another example process for providing user-influenced search results.

FIG. 7 illustrates an example flow diagram of a process 700 for describing implementation of the user-influenced search results described herein, according to at least one example. The one or more search provider computers 210 (e.g., utilizing at least one of the query language/parsing module 234, the output module 238, user/profile module 240, and/or the data mining module 242) shown in FIG. 2 may perform the process 700 of FIG. 7. The process 700 may begin at 702 by recognizing at least a portion of a first search query. At 704, the process 700 may include obtaining first search results. At 706, the process 700 may include providing first search results. At 708, the process 700 may include providing information that assists the user in generating an enhanced search query. At 710, the process 700 may include receiving at least a portion of the enhanced search query. At 712, the process 700 may include obtaining second search results. Further in some examples, the process 700 may end at 714, where the process 700 may include providing the second search results.

Figure 8:
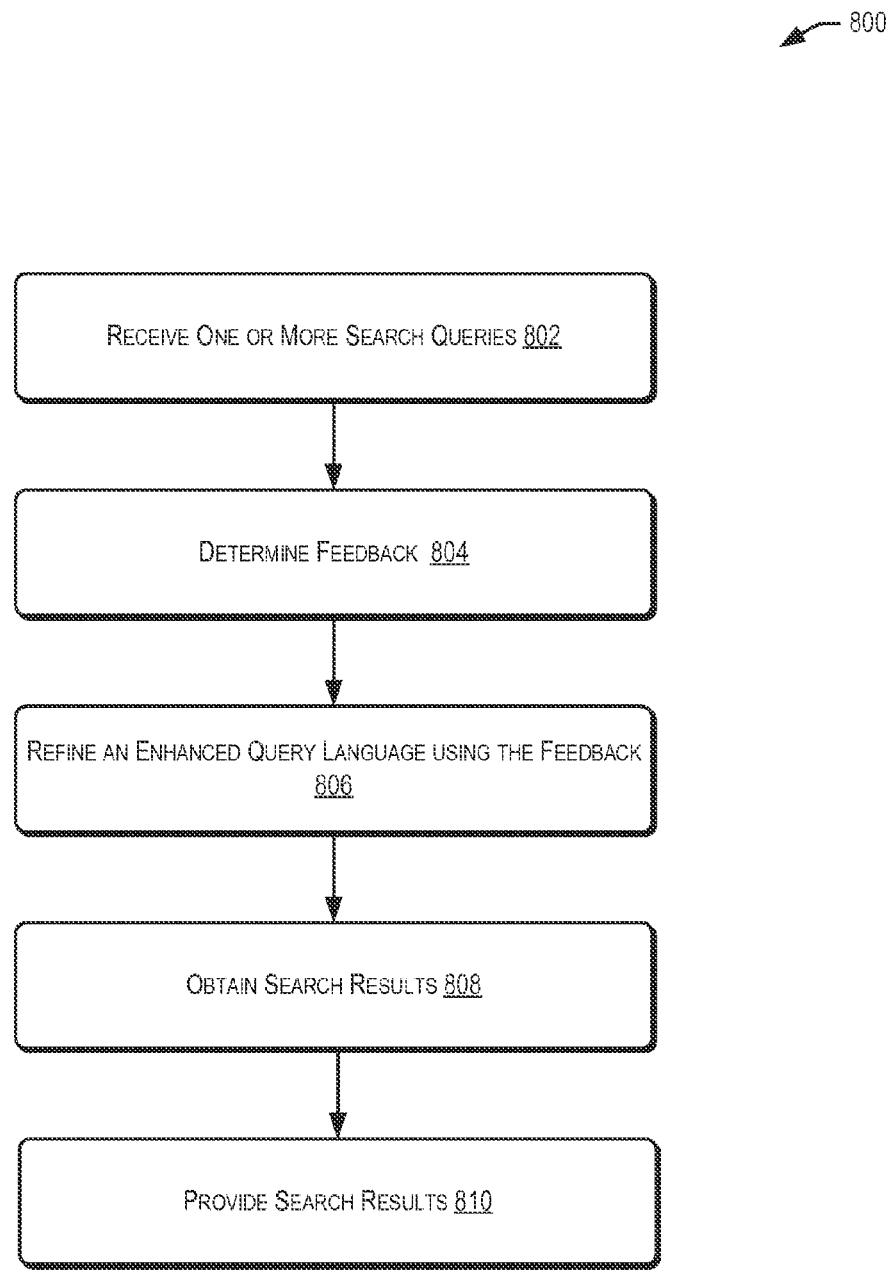
FIG. 8 is a flow diagram illustrating still another example process for providing user-influenced search results.

FIG. 8 illustrates an example flow diagram for providing user-influenced search results, according to at least one example. The one or more search provider computers 210 (e.g., utilizing at least one of the query language/parsing module 234, the output module 238, user/profile module 240, and/or the data mining module 242) shown in FIG. 2 may perform the process 800 of FIG. 8. The process 800 may begin at 802 by receiving one or more search queries. At 804, the process 800 may include determining feedback. At 806, the process 800 may include refining an enhanced query language using the feedback. At 808, the process 800 may include obtaining the search results. Further in some examples, the process 800 may end at 810, where the process 800 may include providing the second search results.

Figure 9:
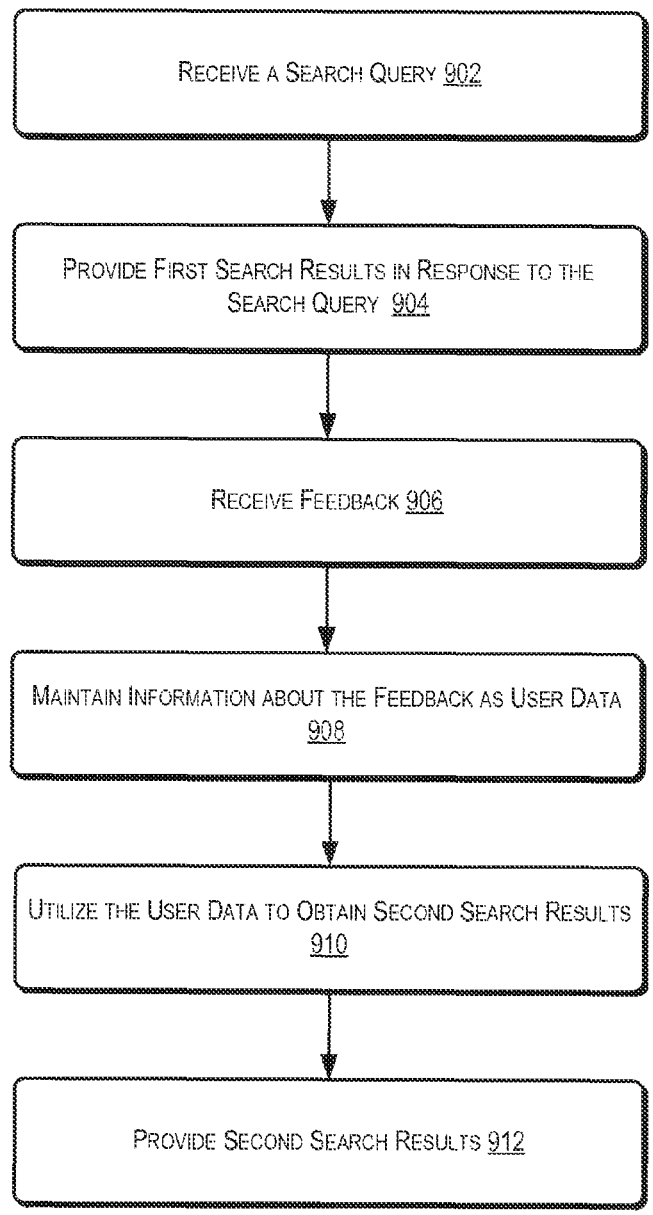
FIG. 9 is a flow diagram illustrating yet another example process for providing user-influenced search results.

FIG. 9 illustrates an example flow diagram for providing user-influenced search results, according to at least one example. The one or more search provider computers 210 (e.g., utilizing at least one of the query language/parsing module 234, the output module 238, user/profile module 240, and/or the data mining module 242) shown in FIG. 2 may perform the process 900 of FIG. 9. The process 900 may begin at 902 by receiving a search query. At 904, the process 900 may include providing first search results in response to the search query. At 906, the process 900 may include receiving feedback. At 908, the process 900 may include maintaining information about the feedback as user data. At 910, the process 900 may include utilizing the user data to obtain second search results. Further in some examples, the process 900 may end at 912, where the process 900 may include providing the second search results.

Figure 10:
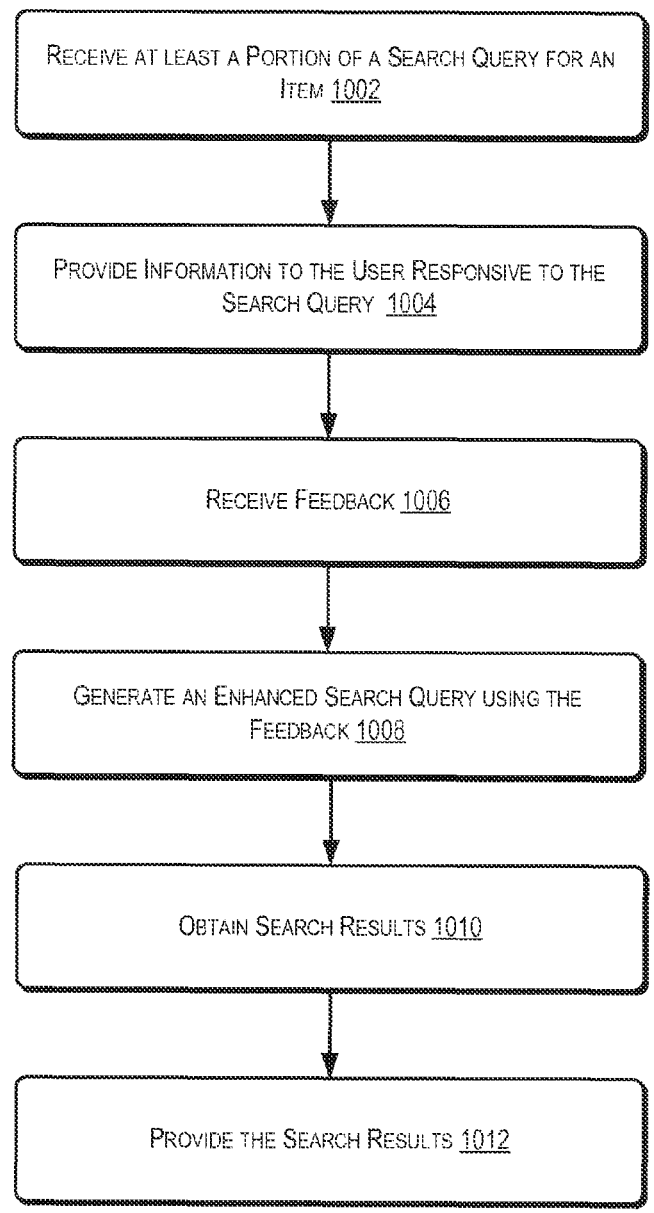
FIG. 10 is a flow diagram illustrating a still further example process for providing user-influenced search results.

FIG. 10 illustrates an example flow diagram for providing user-influenced search results, according to at least one example. The one or more search provider computers 210 (e.g., utilizing at least one of the query language/parsing module 234, the output module 238, user/profile module 240, and/or the data mining module 242) shown in FIG. 2 may perform the process 1000 of FIG. 10. The process 1000 may begin at 1002 by receiving at least a portion of a search query for an item. At 1004, the process 1000 may include providing information to the user responsive to the search query. At 1006, the process 1000 may include receiving feedback. At 1008, the process 1000 may include generating an enhanced search query using the feedback. At 1010, the process 1000 may include obtaining search results. Further in some examples, the process 1000 may end at 1012, where the process 1000 may include providing the search results.

Illustrative methods and systems for generating search results are described above. Some or all of these systems and methods may, but need not, be implemented at least partially by architectures such as those shown at least in FIGS. 2-10 above.

Figure 11:
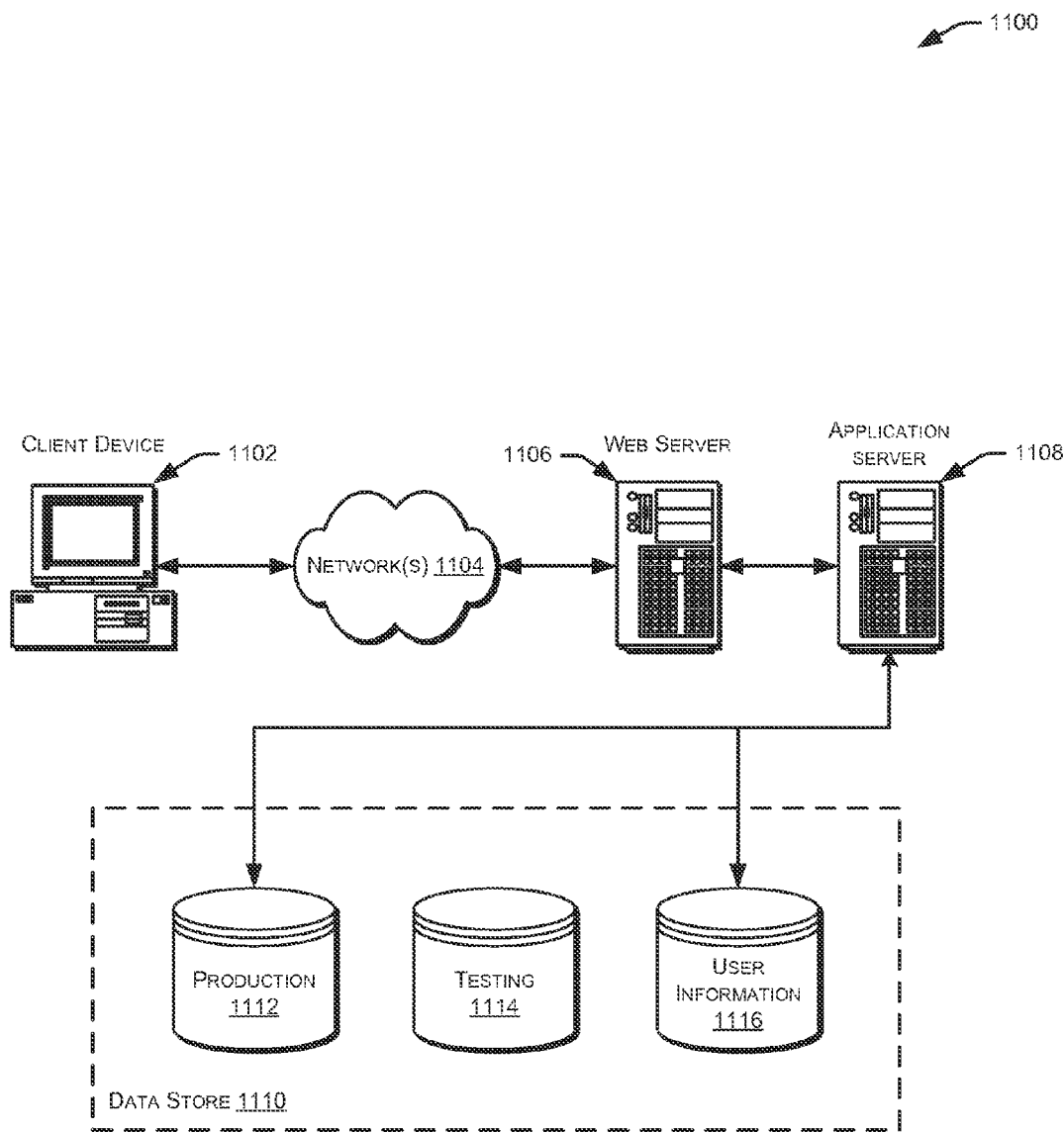
FIG. 11 is a block diagram illustrating another example network environment in which various embodiments of the management of user influenced search results described herein can be implemented.

FIG. 11 illustrates aspects of an example environment 1100 for implementing aspects in accordance with various embodiments. As will be appreciated, although a Web-based environment is used for purposes of explanation, different environments may be used, as appropriate, to implement various embodiments. The environment includes an electronic client device 1102, which can include any appropriate device operable to send and receive requests, messages or information over an appropriate network 1104 and convey information back to a user of the device. Examples of such client devices include personal computers, cell phones, handheld messaging devices, laptop computers, set-top boxes, personal data assistants, electronic book readers and the like. The network can include any appropriate network, including an intranet, the Internet, a cellular network, a local area network or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a Web server 1106 for receiving requests and serving content in response thereto, although for other networks an alternative device serving a similar purpose could be used as would be apparent to one of ordinary skill in the art.

The illustrative environment includes at least one application server 1108 and a data store 1110. It should be understood that there can be several application servers, layers, or other elements, processes or components, which may be chained or otherwise configured, which can interact to perform tasks such as obtaining data from an appropriate data store. As used herein the term "data store" refers to any device or combination of devices capable of storing, accessing and retrieving data, which may include any combination and number of data servers, databases, data storage devices and data storage media, in any standard, distributed or clustered environment. The application server can include any appropriate hardware and software for integrating with the data store as needed to execute aspects of one or more applications for the client device, handling a majority of the data access and business logic for an application. The application server provides access control services in cooperation with the data store, and is able to generate content such as text, graphics, audio and/or video to be transferred to the user, which may be served to the user by the Web server in the form of HTML, XML or another appropriate structured language in this example. The handling of all requests and responses, as well as the delivery of content between the client device 1102 and the application server 1108, can be handled by the Web server. It should be understood that the Web and application servers are not required and are merely example components, as structured code discussed herein can be executed on any appropriate device or host machine as discussed elsewhere herein.

The data store 1110 can include several separate data tables, databases or other data storage mechanisms and media for storing data relating to a particular aspect. For example, the data store illustrated includes mechanisms for storing production data 1112 and user information 1116, which can be used to serve content for the production side. The data store also is shown to include a mechanism for storing log data 1114, which can be used for reporting, analysis or other such purposes. It should be understood that there can be many other aspects that may need to be stored in the data store, such as for page image information and to access right information, which can be stored in any of the above listed mechanisms as appropriate or in additional mechanisms in the data store 1110. The data store 1110 is operable, through logic associated therewith, to receive instructions from the application server 1108 and obtain, update or otherwise process data in response thereto. In one example, a user might submit a search request for a certain type of item. In this case, the data store might access the user information to verify the identity of the user, and can access the catalog detail information to obtain information about items of that type. The information then can be returned to the user, such as in a results listing on a Web page that the user is able to view via a browser on the user device 1102. Information for a particular item of interest can be viewed in a dedicated page or window of the browser.

Each server typically will include an operating system that provides executable program instructions for the general administration and operation of that server, and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available, and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 11. Thus, the depiction of the system 1100 in FIG. 11 should be taken as being illustrative in nature, and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems and other devices capable of communicating via a network.

Most embodiments utilize at least one network that would be familiar to those skilled in the art for supporting communications using any of a variety of commercially-available protocols, such as TCP/IP, OSI, FTP, UPnP, NFS, CIFS and AppleTalk. The network can be, for example, a local area network, a wide-area network, a virtual private network, the Internet, an intranet, an extranet, a public switched telephone network, an infrared network, a wireless network and any combination thereof.

In embodiments utilizing a Web server, the Web server can run any of a variety of server or mid-tier applications, including HTTP servers, FTP servers, CGI servers, data servers, Java servers and business application servers. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python or TCL, as well as combinations thereof. The server(s) may also include database servers, including without limitation those commercially available from Oracle®, Microsoft®, Sybase® and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen or keypad), and at least one output device (e.g., a display device, printer or speaker). Such a system may also include one or more storage devices, such as disk drives, optical storage devices, and solid-state storage devices such as RAM or ROM, as well as removable media devices, memory cards, flash cards, etc.

Such devices also can include a computer-readable storage media reader, a communications device (e.g., a modem, a network card (wireless or wired), an infrared communication device, etc.) and working memory as described above. The computer-readable storage media reader can be connected with, or configured to receive, a computer-readable storage medium, representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules or other data, including RAM, ROM, EEPROM, flash memory or other memory technology, CD-ROM, DVD or other optical storage, magnetic cassettes, magnetic tape, magnetic disk storage or other magnetic storage devices or any other medium which can be used to store the desired information and which can be accessed by the a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Preferred embodiments of this disclosure are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

All references, including publications, patent applications and patents, cited herein are hereby incorporated by reference to the same extent as if each reference were individually and specifically indicated to be incorporated by reference and were set forth in its entirety herein.

What is claimed is:

1. A computer-implemented method comprising:
receiving, from a network page, one or more search queries from a user related to an item, at least a portion of the query language associated with a user profile of the user and stored in a profile data store;
providing, by a computer system, one or more search results based at least in part on the one or more search queries and the query language;
receiving an indication that one or more interactions of the user with the one or more search results have exceeded a threshold;
providing information to the user responsive to the one or more interactions;
receiving feedback from the user in response to the information, the feedback defining terms in the one or more search queries related to the one or more search results;
receiving profile information associated with the terms and the user profile from the profile data store, the profile information identifying a group profile for a group of users that comprises rules for refining the search results for the group of users, and the user profile comprising the rules of the group profile;
refining, by a computer system, the query language for generating search results using the feedback and the rules to generate an enhanced query language;
providing sample results prior to providing enhanced search results, the sample results provided based at least in part on the enhanced query language;
updating the user profile with the feedback and the rules;
obtaining the enhanced search results from a search results data store utilizing the enhanced query language; and
providing the enhanced search results to the user.

2. The computer-implemented method of claim 1, wherein the enhanced search results find at least one item using metadata associated with the item.

3. The computer-implemented method of claim 1, wherein the enhanced search query includes a search term and a query syntax, and wherein the enhanced search results include items related to the search term.

4. The computer-implemented method of claim 1, wherein the one or more interactions have exceeded the threshold when the user conducts at least three searches without ordering the item and the search queries are related to the item.

5. The computer-implemented method of claim 1, wherein the search results data store includes identifiers related to the item, and wherein the enhanced search results include information about the item.

6. The computer-implemented method of claim 1, further comprising updating user data that associates the enhanced query language with the user, the user data including at least a portion of a dictionary that associates the enhanced query language with a query syntax.

7. A computer-implemented method comprising:
receiving one or more search queries from a user related to an item, the one or more search queries written in a query language associated with a user profile of the user and stored in a profile data store;
determining, by a computer system, feedback associated with an interaction by the user with search results for the one or more search queries;
receiving profile information associated with the user profile of the user from the profile data store, the profile information identifying a group profile for a group of users that comprises rules for refining the search results for the group of users, and the user profile comprising the rules of the group profile;
refining, by the computer system, an enhanced query language using the feedback and the rules;
providing sample results prior to providing enhanced search results, the sample search results provided based at least in part on the enhanced query language;
updating the user profile with the feedback and the rules;
obtaining the enhanced search results utilizing the enhanced query language; and
providing the enhanced search results.

8. The computer-implemented method of claim 7, wherein a search results data store that provides the enhanced search results stores at least metadata associated with one or more items provided on a network page.

9. The computer-implemented method of claim 7, wherein the feedback is based at least in part on a purchase history of the user associated with items provided in the search results.

10. The computer-implemented method of claim 7, wherein the enhanced search results are different results than results associated with the one or more search queries from the user.

11. The computer-implemented method of claim 10, wherein the different results exclude specific subsets of the search results to include fewer items in the enhanced search results.

12. The computer-implemented method of claim 10, wherein the different results modify specific subsets of the search results to include related items in the enhanced search results.

13. The computer-implemented method of claim 7, wherein user data includes at least a portion of a dictionary that defines what terms mean to the user.

14. The computer-implemented method of claim 7, wherein a comment is accessible through a link on a network page that displays a graphical user interface, and wherein the one or more search queries are received through a text box on the network page.

15. One or more computer-readable non-transitory media storing computer-executable instructions that, when executed by one or more computer systems, configure the one or more computer systems to perform operations comprising:
receiving a search query from a user, the search query comprising a search term for an item;
providing first search results in response to the search query;
receiving feedback on the first search results;
storing information about the feedback as user data, the user data associated with a user profile of the user and stored in a profile database;
receiving profile information associated with the user profile that identifies a group profile for a group of users that comprises rules for refining the search results for the group of users, and the user profile comprising the rules of the group profile;
updating the user profile with the feedback and the rules;
utilizing the user data and the rules to obtain second search results;

providing sample results prior to providing the second search results; and providing the second search results.

16. The one or more computer-readable non-transitory media of claim 15, wherein the search query is compared to item metadata stored in a data store that provides the second search results to find one or more items associated with the item.

17. The one or more computer-readable non-transitory media of claim 15, wherein the search term is a first term, wherein the search query includes a second term and the first term, wherein the search results include first search results associated with the first term and second search results associated with the second term, and wherein the second search results are filtered from the first search results.

18. The one or more computer-readable non-transitory media of claim 15, wherein the user data includes a query syntax, and wherein the search results are ordered based at least in part on an operation associated with the query syntax.

19. The one or more computer-readable non-transitory media of claim 15, wherein the user is a first user, and wherein the user data is previously associated with a second user and shared by the second user with the first user.

20. The one or more computer-readable non-transitory media of claim 15, wherein the user is a first user, and wherein the user data is previously associated with a second user that is generated by the one or more computer systems and automatically associated with the first user.

21. A system comprising:
at least one memory that stores computer-executable instructions; and
at least one processor configured to access the at least one memory, wherein the at least one processor is configured to execute the computer-executable instructions to collectively at least:
receive at least a portion of a search query for an item associated with a user profile of a user and stored in a profile data store;
provide result information to a user responsive to the search query;
receive feedback from the user in response to the result information;
receive profile information associated with the user profile of the user, the profile information identifying a group profile for a group of users that comprises rules for refining the search results for the group of users, and the user profile comprising the rules of the group profile;
generate an enhanced search query using the feedback and the user profile;
update the user profile with the feedback;
obtain the search results using the enhanced search query;
provide sample results prior to providing the search results; and
provide the search results to a user device operated by the user.

22. The system of claim 21, wherein the search results are ordered based at least in part on the feedback.

23. The system of claim 21, wherein the search results are ordered by showing best-selling items higher than other items.

24. The system of claim 21, wherein the search results are filtered based at least in part on the feedback.

25. The computer-implemented method of claim 1, wherein the user profile comprising the rules of the group profile comprises the user profile inheriting the rules of the group profile.

* * * * *